United States Patent [19]
Mitchell

[11] 3,944,363
[45] Mar. 16, 1976

[54] FOCUSING DEVICE AND METHOD OF USE THEREOF FOR PHOTOGRAPHIC ENLARGER

[75] Inventor: Robert W. Mitchell, St. Joseph, Mich.

[73] Assignee: Photo Systems, Inc., Dexter, Mich.

[22] Filed: Sept. 19, 1974

[21] Appl. No.: 507,397

[52] U.S. Cl. ................................. 355/60; 355/77
[51] Int. Cl.² ......................................... G03B 27/70
[58] Field of Search ................. 355/77, 60; 354/201

[56] References Cited
UNITED STATES PATENTS

| | | | |
|---|---|---|---|
| 2,082,170 | 6/1937 | McRae | 355/60 X |
| 3,625,609 | 12/1971 | Clapp | 355/60 |

*Primary Examiner*—Richard A. Wintercorn
*Attorney, Agent, or Firm*—Neuman, Williams, Anderson & Olson

[57] ABSTRACT

The present invention is an optical aid especially applicative as a focuser for use with photographic enlargers. The structure of the device makes it possible to focus at any point on the projected image at the easel surface. The focuser can be hand held by the operator with one reference point placed on the easel surface in an area where the image is to be focused. The focuser has a mirror which reflects the light of the enlarging apparatus onto an integral viewing surface with the distance from the reference point to the center of the mirror along a reference axis being precisely the same as the distance from the center of the mirror to the center of the viewing surface along a viewing surface axis. The angle of the viewing axis relative to the mirror surface must be the same as the angle of the reference axis to the mirror surface. By maneuvering the focuser while keeping the reference point in contact with the desired focusing point on the easel surface, the distance that a light ray would travel from the enlarging lens to the focusing point is equal to the distance from the enlarging lens ot the midpoint of the mirror surface plus the distance from the midpoint of the mirror surface to the veiwing surface. The maneuvering or tilting of the focuser changes the normal height of the midpoint of the mirror with reference to the easel surface and changes the angle that the planar mirror makes with a horizontal axis. However, by maintaining the reference point generally in the center of the shadow cast by the mirror it is possible to maintain the equality in the above distance equation.

11 Claims, 11 Drawing Figures

ACTUAL LIGHT PATH ———
REFLECTED LIGHT PATH -----
IF NOT REFLECTED LIGHT PATH —-—-

FOCUSING DEVICE AND METHOD OF USE THEREOF FOR PHOTOGRAPHIC ENLARGER

BACKGROUND OF THE INVENTION

There are currently two basic types of focusing devices for use with a photographic enlarger known in the prior art, to gain a complete understanding of any focusing device, a basic familiarity with the photographic enlarging process is a prerequisite. The basic elements of the photographic enlarger which functionally cooperate with the focusing device are the light source, the lens and the easel. These three elements are arranged in a stacked vertical arrangement and a photographic negative is placed between the light source and the lens. The image of the photographic negative is projected onto the surface of the easel. Since the printing paper is of negligible thickness and is placed on the surface of the easel, the image projected onto the easel surface will be substantially and for all practical purposes the same image as is ultimately transferred onto the print paper. Therefore, throughout the disclosure the easel surface is referred to as a fixed measuring point for convenience of description but it is to be understood that the surface of the print paper is technically the precise distance measuring point. Therefore, to achieve ultimate accuracy, it is possible to place a sheet of material on the easel surface which is the same thickness as the printing paper which will eventually be used and then make all measurements from the surface of that sheet of material. The lens is adjustable to vary the distance between it and the photographic negative to thereby properly focus the projected image of the negative on the surface of the easel. To aid the photographer in determining the proper adjustment of the lens with respect to the photographic negative, the focusing devices of the prior art were developed. The principal of operation of the focusing device was to reflect the projected light from the enlarger's light source with a mirror mounted in the focuser onto a viewing surface portion of the focuser. To obtain the same image in the plane of the viewing surface of the focuser as would appear at the surface of the easel, the distance from the midpoint of the mirror to the plane must be exactly equal to the distance from the midpoint of the mirror to the easel. Therefore, the distance that a light ray would travel from the lens of the enlarging device to the surface of the easel is the same as the distance a light ray will travel from the lens of the enlarging device to the midpoint of the mirror plus the distance from the midpoint of the mirror to the surface of the viewing plane. Some prior art focusers, such as McRae U.S. Pat. No. 2,082,170, profess the ability to properly operate at any point on the easel surface but based on well-established laws of optics, their structure precludes such operation. For very minor displacements from the center point, the angular placement of the mirror surface as compared to the viewing surface will correct for any slight distance deviation and a correct image will be maintained. However, when the prior art focuser is moved substantially off center then the above distance equation becomes unbalanced and the angular positioning of the mirror and viewing surfaces is inadequate to correct the discrepancy. In this latter case, the prior art focuser will produce at best a false image causing improper adjustment to the position of the enlarging lens and more likely will produce no image at all.

The first type of the prior art focusers uses a finely ground glass surface as the plane upon which the reflected image of the photographic negative is focused. To improve the accuracy of this focusing device, a simple magnifying lens is commonly positioned above the ground glass surface. The second type of focuser known in the prior art works essentially in the same manner as the ground glass focuser just described. The primary difference being that the ground glass screen is replaced by a high-powered optical eye piece which focuses on an aerial image of the projected negative. At the plane where the reflected image is focused, a clear glass reticle is positioned. A pattern is commonly etched on the reticle so that the eye piece can be focused to suit the individual photographer. By the use of the high-powered eye piece, a greatly enlarged view of the image on the easel is produced. Other than the increased power of magnification of the reflected image, both the ground surface-type device and the clear glss reticle-type device operate in the same manner.

Both prior art type focusers have fixed bases which are designed to sit on the easel surface in the center of the projected image. These focusing devices have a fixed reflecting mirror which is positioned at a small acute angle from the horizontal. Therefore these focusing devices, for proper operation, must be placed only in the center of the projected image on the enlarging easel and the focus of the image at the corners or any position other than the center of the projected image is not possible. When the focusing devices of the prior art are placed in any position other than the center of the projected image on the easel, a false image is seen at the viewing surface since the measurement of the distance that the light ray will travel from the enlarging lens to the surface of the easel is not equal to the distance that a light ray will travel from the enlarging lens to the midpoint of the mirror surface plus the distance from the midpoint of the mirror surface to the projected image viewing point. Therefore, it is not possible to measure the proper focusing for the projected image at any point other than the center of the projected image itself since only at this point are the above distances equal. Another disadvantage of the prior art occurs when the easel itself is tilted to compensate for vertical distortion such as may be present when tall buildings are positioned inward towards the center of the picture. The prior art focusers based upon the above explanation of their operation can not operate properly under these circumstances.

SUMMARY OF THE INVENTION

The present invention is an optical aid, and especially useful as a focuser in conjunction with photographic enlargers. The focuser comprises a housing or frame which forms a first end or reference point which will contact the easel surface (print paper surface actually as previously explained) at the point desired to be focused, a mirror mounted at an angle from the horizontal and adapted to reflect incident light rays from the enlarger, and a ground glass viewing surface adapted for viewing the image reflected by the mirror and mounted at an angle double the mirror mounting angle.

The distance from the midpoint of the mirror to the reference point forms an axis of reference and is equal to the distance from the midpoint of the mirror to the viewing surface forming an axis of viewing. The mirror bisects the angle formed between the axis of reference and the axis of viewing. By maneuvering or tilting the focuser while keeping the reference point at the point on the easel surface which is to be focused and maintaining the reference point as the center point of a shadow cast by the mirror the distance that a light ray travels from the enlarging lens to the focusing point is equal to the distance from the enlarging lens to the midpoint of the mirror plus the distance from the midpoint of the mirror to the viewing surface. The focuser can therefore be used to focus at any point on the easel surface and the proper reflected image will be viewed at the viewing surface thereby allowing the operator to adjust the distance of the enlarging lens from the negative or to make any other optical adjustment in the enlarger to obtain the desired clarity of focus.

It is an object of the present invention to provide a focuser which is operative when placed at any point on the easel surface.

It is a further object of the present invention to provide a hand-held focuser which is operatable when the easel surface itself is tilted.

It is an additional object of the present invention to provide a focuser which can focus at any point on the easel surface by tilting or swiveling the focuser while maintaining point contact with the easel surface thereby changing the height of the midpoint of the mirror surface from the easel and the angle the mirror makes with the horizontal.

A still further object of the present invention is to provide a focuser which has a viewing surface that is adjustable in height and a joint or pivot point which maintains the angle of the reflecting means bisecting the angle between the reference axis and the viewing axis regardless of the adjusted position of the viewing surface.

BRIEF DESCRIPTION OF DRAWINGS

Further and additional objects will appear from the following detailed description of a specific embodiment read in conjunction with the accompanying drawings, wherein.

DETAILED DESCRIPTION OF THE DRAWINGS

Figure 1:
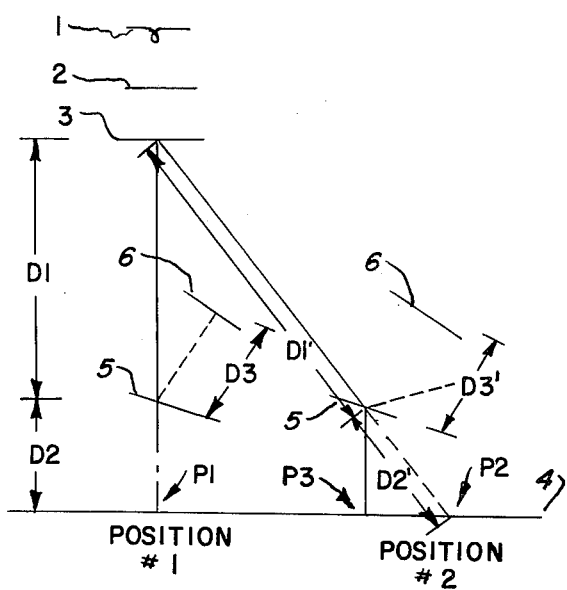
FIG. 1 is a ray diagram illustrating the operation of the prior art focuser at two different positions on the easel surface.

FIG. 1 is a ray diagram illustrating the basic disadvantage of the prior art system. Basic elements of the photographic enlarger itself are illustrated at light source 1, the enlarging lens 3 and the easel 4. A photographic negative 2 is inserted between the light source 1 and the enlarging lens 3. It is obvious that the term photographic negative used for convenience herein defines any film through which light will pass to generate an image. It should be noted that to properly focus the photographic image onto the easel surface 4 the enlarging lens 3 is movable in a vertical direction either towards the photographic negative or away from the negative. The basic prior art focusing device consists of the mirrored surface 5 and the ground glass surface 6. Both the mirror and the ground glass surface are held in a fixed position and at a fixed angle to one another by a base structure (not illustrated). In position number 1, the focusing device is placed at the center of the projected image from the negative on the easel surface. When in this position, the distance that a light ray travels from the enlarging lens 3 to the surface of the easel 4 is the distance D1 plus D2. D1 is the distance from the enlarging lens 3 to the midpoint of the mirror surface 5. D2 is the distance from the midpoint of the mirror surface 5 to the surface of the easel 4. In position number 1, the distance that the light ray travels from the enlarging lens 3 to the reflected plane of the ground glass surface 6 in D1 plus D3. D1 is still the distance from the enlarging lens 3 to the midpoint of the mirror surface 5. D3 is the distance from the midpoint of the mirror surface 5 to the ground glass plane 6. Since in the prior art devices the distance from the ground glass surface 6 to the midpoint of the mirror surface 5 is fixed and equal to the fixed distance from the midpoint of the mirror 5 to the surface of the easel 4, the image viewed by the photographer on the ground glass surface 6 will be the same image as that which would appear on the surface on the easel at the point P1. Therefore, the photographer can vary the distance between the photographic negative 2 and the enlarging lens 3 properly focus the projected image on the easel surface 4 while the photographer is viewing the reflected image on the ground glass surface 6.

Now, if the prior art focuser is moved to a position away from the center point of the easel such as position No. 2 in FIG. 1, an inaccurate measurement will result. The distance that a light ray will travel from the enlarging lens 3 to the surface of the easel 4 is D1′ plus D2′. D1′ is the distance from the enlarging lens 3 to the midpoint of the mirror 5. D2′ is the distance from the midpoint of the mirror 5 to the easel surface 4 at point P2. The distance that a light ray will travel to the reflected ground glass surface 6 is D1′ plus D3′ (D3′ is the same distance as D3 in position number 1). D1′ is the distance from the enlarging lens 3 to the midpoint of the mirror 5. D3′ is the distance from the midpoint of the mirror 5 to the surface of the ground glass 6. However, since the distance D3′ which is the distance from the midpoint of the mirror 5 to the surface of the ground glass 6 is fixed and unequal to the distance D2′ the image which the photographer will view on the ground glass surface 6 is not the image of the point P2 on the surface of the easel 4 where the light ray will strike but the image at a point P3 on the easel surface 4. The point P3 is on the easel surface 4 at a distance D2 (the same distance as D2 in position number 1) away from the midpoint of the mirror surface 5 which is equal to the distance D3′. This false image point P3 will then be directly below the midpoint of the mirror 5 since this is the only point on the surface of the easel 4 which is precisely equal to the distance D3′ measured from the midpoint of the mirror 5. Therefore, the distance which the light ray will travel to the surface of the easel 4 and the distance that the light ray will travel to the surface of the ground glass 6 are unequal. Since these distances are unequal, it is not possible to properly focus the enlarging lens 3 since the photographer will be viewing at best the false image of point P3 on the ground glass surface 6 which is different than the true image at the point P2 or the photographer will be viewing no image at the ground glass surface 6 since no light will be reflected at the proper angle to strike the surface.

Figure 2:
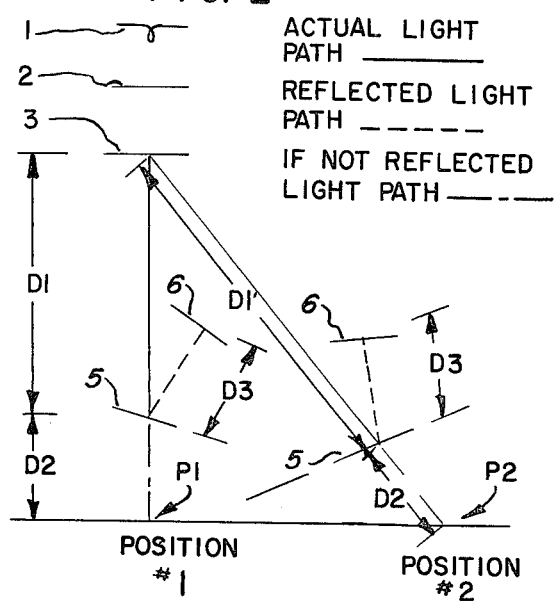
FIG. 2 is a ray diagram illustrating the operation of the present invention at two different positions on the easel surface.
Figure 3:
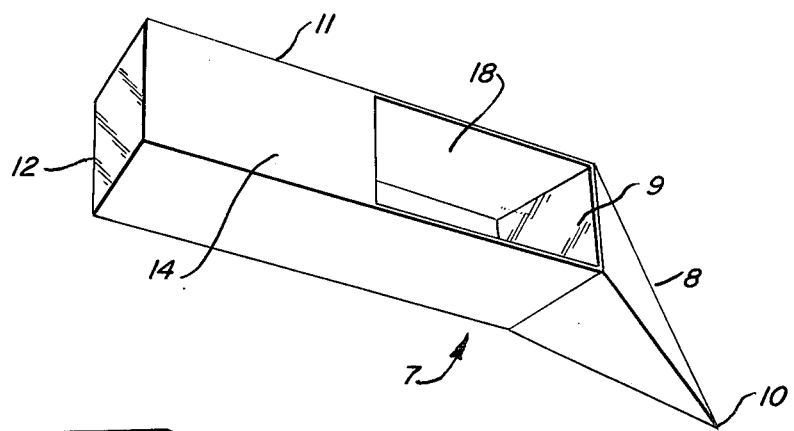
FIG. 3 is a perspective view of the preferred embodiment.

FIG. 2 is a ray diagram representing the operation of the present system. Here again, the basic elements of the photographic enlarger are present being the light 1, the enlarging lens 3 and the easel 4. The photographic negative 2 is again inserted between the light source 1 and the enlarging lens 3. The operation of the present invention at position number 1 reflecting the image at point P1 which is the center point of the easel 4 is identical to the operation of the prior art systems. However, when the present focuser is moved to a point P2 away from the center point of the easel, a true and accurate measurement is still obtained enabling the operator to adjust the enlarging lens 3 to properly focus at any point P2 on the easel surface 4.

At position number 2, the distance that the light ray has to travel from the enlarging lens 3 to the surface of the easel 4 is D1' plus D2'. D1' is the distance from the enlarging lens 3 to the midpoint of the mirror 5. D2' is the distance from the midpoint of the mirror 5 to the surface of the easel 4 at point P2. The distance that the light ray must travel to the ground glass surface 6 is the distance D1' plus D3'. D1' is still the distance from the enlarging lens 3 to the midpoint of the mirror 5. D3' is the distance from the midpoint of the mirror 5 to the surface of the ground glass lens 6. The total distance which the light ray must travel from the enlarging lens 3 to the surface of the easel 4 (D1' plus D2') is equal to the distance from the enlarging lens 3 to the ground glass surface 6 (D1' plus D3'). The reason why the proper image is reflected on the surface of the ground glass 6 is that the distance from the ground glass 6 to the midpoint of the mirror 5 and the distance from the midpoint of the mirror 5 to the point where the light ray will strike the easel 4 is kept equal. Since these two distances are equal, the present invention will work in the same manner as if it were at the point P1, the midpoint, of the easel 4. It should be noted that the midpoint of the mirror surface 5 in position No. 2 is lower than the midpoint of the mirror surface 5 in position No. 1 both referenced from the surface of the easel 4. Also, the angle that the mirror surface 5 makes with respect to the horizontal easel surface 4 is changed. It is this lowering of the midpoint of the mirror surface and the changing of the angle of the mirror surface which enables the photographer to keep the total distance traveled by the light ray from the enlarging lens 3 to the surface of the easel 4 equal to the total distance traveled by the light ray from the enlarging lens 3 to the surface of the ground glass 6.

The structure of the focusing device of the present invention is illustrated in FIG. No. 3. The general structure in indicated at 7 and it is substantially V-shaped and of such a size that the photographer can conveniently hand hold the focuser. The structure of the focuser is not limited to being V-shaped and can assume any free form design provided only the distance and angular relationships between the reference point, midpoint of the mirror and viewing surface are maintained. For the purpose of description, the focuser will be considered to have a lower and an upper portion. It should be noted that the entire structure may consist of a single unitary housing or the housing may be separatable into two or more segments with the individual segments or portions being jointed together. In the preferred embodiment, the sides of the housing are opaque however it is understood that all the sides may be either clear or completely removed leaving only a wire type frame outline. The lower portion of the focuser consists of a pyramid 8 either hollow or solid. Any other similarly shaped member such as a cone could be used as the lower portion of the focuser 7. At the base of the pyramid 8 a reflective means such as a mirror 9 with at least one reflective surface is mounted at an acute angle with the horizontal and its reflecting surface facing away from the vertex of the pyramid 8 which forms the reference point 10. The only structural requirement of the lower portion of the focuser is that it contains an area at which to mount the reflective means, a reference point spaced a distance from the reflective means and adapted to contact any point of the projected image on the easel surface and the distance from the reference point to midpoint of the mirror, forming a reference axis, be fixed.

Figure 5:
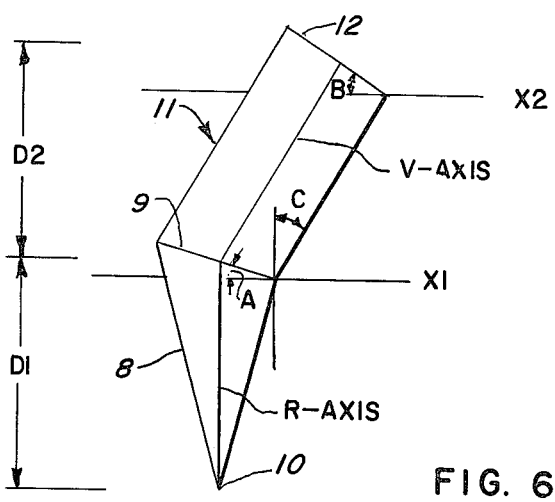
FIG. 5 illustrates the angular positions and distances in the structure of the present invention.

The upper portion of the focuser is indicated at 11 and is hollow and substantially rectangular in shape. Any shape which is structurally compatible with the lower portion can be used. One end of the substantially rectangular upper portion 11 is connected to the base of the pyramid 8. The sides of the upper portion 11 in the preferred embodiment form an angle measured from the vertical which is twice the acute angle at which the mirror 9 is mounted. This angular connection is best shown in FIG. 5. At the opposite end of the hollow rectangular upper portion 11, the ground glass 12 is placed. This ground glass viewing plane 12 is mounted at an acute angle to the horizontal. The acute angle of the ground glass is twice as large as the angle at which mirror 9 is mounted. The upper portion 11 functions as a conduit or channel through which the light rays reflected by mirror 9 will travel to the viewing surface 12. Therefore, in the preferred embodiment, the upper portion 11 is made from an opaque material which is better adapted to transmit light rays for viewing. It should be realized that the upper portion 11 could be constructed of a wire type form which is then shrouded. In yet another embodiment, the upper portion 11 could be merely a wire form or made from a non-opaque material. The only structural requirements of the upper portion 11 is that it be adapted to be connected to the remainder of the structure, that it have an area to mount the viewing surface 12 at an angle measured from the horizontal double the angle that the mirror 9 is mounted as measured from the horizontal, and the shortest distance from the midpoint of the mirror to the viewing surface, forming a viewing axis, be equal to the distance from the midpoint of the mirror to the reference point 10. The top side 14 of the substantially rectangular upper portion 11 in the preferred embodiment has a cut out section 13. The cut out section 13 extends along the entire width of the top side 14, that is, along the entire edge of one side of the base of pyramid 8. The cut out section 13 also extends from the mirror 9 along approximately one-half of the length of the upper portion 11. It is through this cut out portion 13 that light will enter the focusing device to be reflected by the mirror 9 towards the ground glass surface 12. It should be noted that the distance from the midpoint of the mirror 9 mounted at the base of the pyramid 8 to the tip or reference point 10 along the reference axis is exactly the same as the shortest distance from the midpoint of the mirror 9 to the surface of the ground glass 12 along the viewing axis.

Figure 4:
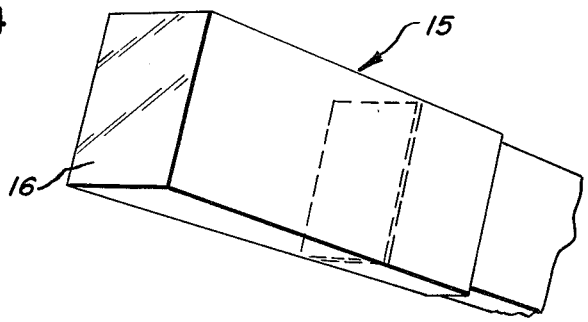
FIG. 4 is a perspective view illustrating the magnifier addition to the preferred embodiment.

An alternative embodiment is illustrated in FIG. 4. In this alternative embodiment, a section has been added to the upper portion of the focuser 11. The addition is in the form of a magnifier section 15. The magnifier section 15 is also substantially rectangular but slightly larger in cross-section as that of the upper portion 11 thereby enabling the magnifier section 15 to fit over in a telescoping relationship with the upper portion 11. At the opposite end of the magnifier portion 15, there is placed a magnifying lens 16. This arrangement does not change any of the optical properties of the focusing device except the magnification factor. Of course, if still greater magnification is desired, the ground glass 12 could be replaced by a high powered eye piece which focuses on an aerial image of the projected negative. At the plane where the reflected image is focused, a clear glass reticle is positioned. A pattern is commonly etched on the reticle so that the eye piece can be focused to suit the individual photographer.

FIG. NO. 5 illustrates the preferred angular positioning of the mirror 9 and the viewing surface 12 and the necessary distance equality between the distance from the midpoint of the mirror 9 along the reference axis R to the reference point 10 and the distance from the midpoint of the mirror 9 along the viewing axis V to the viewing surface 12. The mirror 9 is mounted at an angle A equal to 16° from the horizontal plane X1 (plane X1 is parallel to plane X2). Therefore, the ground glass viewing plane 12 is mounted at an angle B equal to 32° from the horizontal plane X2 (twice the angle at which the mirror 9 is mounted). Therefore, the ground glass viewing plane 12 is maintained perpendicular to the viewing axis V. This particular structural relationship is necessitated by the optical laws of reflection. The basic law of optics involved is that the angle of incidence of a light ray from a smooth planar surface is equal to the angle of reflection. Assume that both the angle of incidence and reflection are measured from the normal line perpendicular to a planar surface and that the planar surface is rotated clockwise by 16°. The new normal line has been shifted clockwise by 16° thereby increasing the angle of incidence by 16°. Since the angle between the incident and reflected rays must always be twice the angle of incidence the angle that the reflected ray makes with the incident ray is increased by twice 16° or in other words the angle of reflection is increased by 32°. The distance from the midpoint of the mirror surface 9 to the tip or reference point 10 is D1 measured along the reference axis R; the shortest distance from the midpoint of the mirror surface 9 to the ground glass surface 12 is D2 measured along the viewing axis V; the distance D1 and D2 are equal. The mirror 9 must bisect the angle formed by the reference axis R and the viewing axis V. The walls of the upper portion 11 make an angle C measured from the vertical. The angle C is equal to twice the angle A. Hence, angle C is equal to 32° measured from the vertical or the complement of angle C is equal to 58°. It should be understood the angles used in FIG. 5 are merely illustrative and that any angle could be chosen for angle A with the other angles being determined by the above described angular relationships. Naturally if a free form design is employed then the angle C does not have to be maintained.

Figures 6A, 6B, 6C:
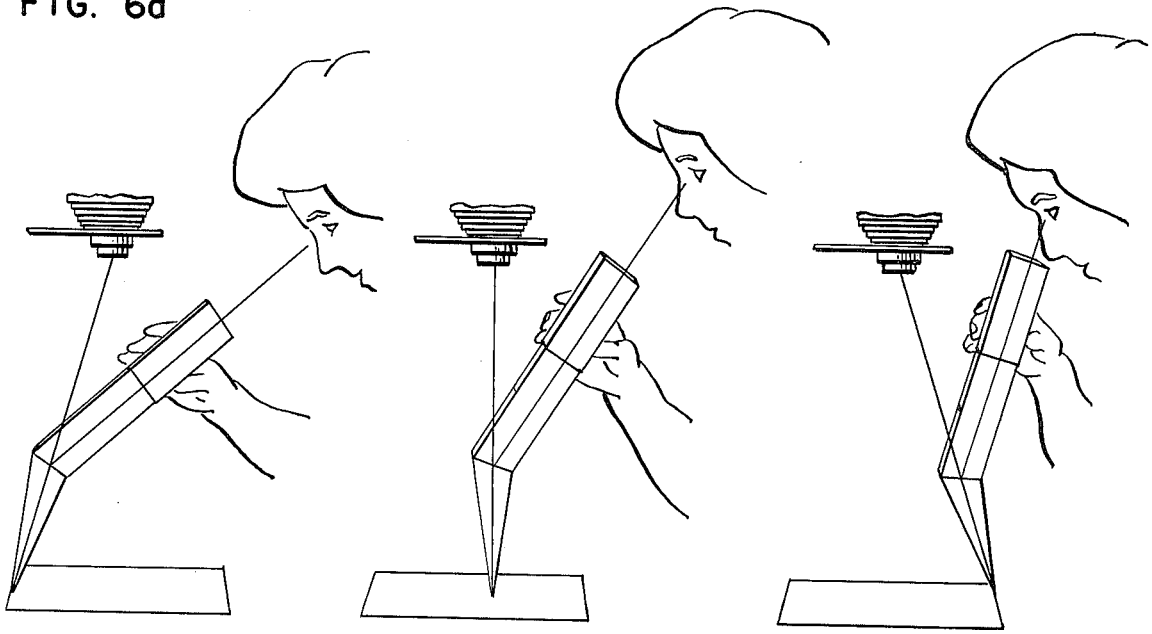
FIGS. 6a, 6b and 6c illustrate the operation of the present invention at different points on the easel surface.

FIGS. 6a, b and c illustrate several positions of operation of the focuser including the magnifier addition 15. These figures are merely examplars of the use of the focuser and are not drawn with precise angular measurements. FIG. 6a shows the focuser positioned to adjust the focus for the rear of the projected image. The position in which the focuser 7 should be held is determined by placing the tip or reference point 10 on any point of the projected image on easel 4 and then moving the entire focuser 7 to different positions while maintaining tip 10 at the same point until the mirror 9 cast a symmetrical shadow with the point of the easel 4 in contact with tip 10 forming the center point. Once the shadow cast by mirror 9 is sysmmetrical about the point on the surface of easel 4 contacting tip 10 that position of the focuser 7 should be maintained. Only when the focuser 7 is held in this position will the reflected image of the negative 2 be visible at the viewing screen surface 12. If the angle between the reference axis R and the easel surface 4 is altered so that the reference point 10 is no longer at the center of the shadow cast by the planar mirror 9 the viewing screen will remain blank. When the focuser 7 is in this position, the total distance that a light ray travels from the enlarging lens 3 to the point on the surface of easel 4 contacting tip 10 is equal to the distance a light ray travels from the enlarging lens 3 to the midpoint of the mirror 9 plus the distance from the midpoint of the mirror 9 to the ground glass surface 12.

FIG. 6b shows the proper position of the focuser 7 to adjust the focus for the projected image at a point at the center of the easel 4. FIG. 6c shows the position of the focuser 7 to properly adjust the focus with a point at the front of the projected image as the reference. Once the focuser 7 is in any one of the positions illustrated in FIGS. 6a, b or c, the image viewed by the photographer or operator on the ground glass surface 12 will be the same as the image that would appear at the point of the easel 4 contacting tip 10. Therefore, if the image viewed at ground glass surface 12 is not clear and definite, the operator can adjust the enlarging lens 3 to vary the distance between it and the photographic negative 2 until the image is of the resolution desired.

Figure 7A:
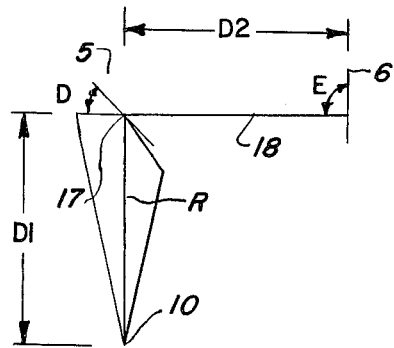
FIGS. 7a and 7b illustrate two positions in an alternative embodiment of an adjustable focuser.
Figure 7B:
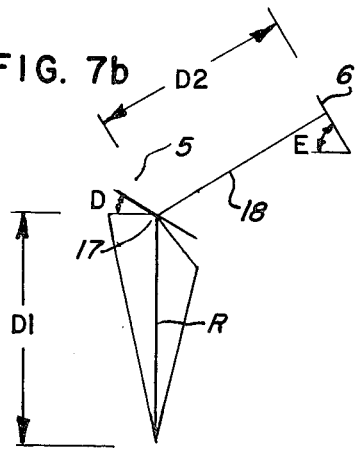
Figure 7C:
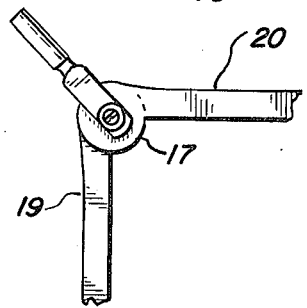
FIG. 7c illustrates a well-known joint for use with the adjustable focuser.

FIGS. 7a, 7b and 7c show an alternative structure for the focuser incorporating adjustability as a feature. In FIG. 7a, the focuser is shown with the mirror 5 at an angle D equal to 45° from the horizontal. Therefore, since the angle of the ground glass must be twice the angle of the mirror, the angle E of the ground glass equals 90°. A joint or pivot 17 connects at least the mirror 5 and the arm 18 forming at least a segment of the upper portion of the focuser housing. The distance from the midpoint of the mirror 5 to the point of reference or tip 10 of the focuser structure is D1 and forms a reference axis R. The distance shortest from the midpoint of the mirror 5 to the viewing surface is D2 and forms a viewing axis V which in FIG. 7a would be along the arm 18. The distance D1 is equal to the distance D2. The joint 17 allows the arm 18 to be moved to a new position as shown in FIG. 7b. As the arm 18 is moved to the position as shown in FIG. 7b, the joint 17 correspondingly moves the mirror 5 to a new angular position. The relationship which is maintained is that the mirror 5 must bisect the angle formed by the reference axis R and the viewing axis V. The angle that the ground glass 6 makes with the horizontal is also maintained at twice the angle of the mirror 5 measured from the horizontal and, of course, the ground glass 12 is perpendicular to the viewing axis V. In FIG. 7b, the mirror 5 makes an angle D with the horizontal of 30°. The viewing surface 6 makes an angle E with the horizontal which is twice angle D or 60°. The distance D1 along the axis of reference R is equal to the distance D2 along the axis of viewing.

Thus, by using the joint 17, the focuser is made adjustable and the proper angular relationships are maintained. Naturally, the focuser could be adjusted to any position and FIGS. 7a and 7b are merely examples.

The joint or pivot 17 can be any well-known device such as the pivot of a standard drafting divider or compass. An illustration of such a well-known mechanism is shown in FIG. 7c. One leg 19 of the compass would represent the reference axis R and the other leg 20 would represent the viewing axis V.

It is to be understood that the present disclosure can be modified or varied by applying current knowledge without departing from the spirit and scope of the novel concepts of the invention.

I claim:

1. An optical aid for viewing an image projected on a projection surface comprising:
    support means;
    reflective means mounted on said support means and defining a generally planar reflective surface,
    reference means defining a reference point spaced from said reflective surface a predetermined distance and lying generally along a reference axis passing through a central portion of said reflective surface and forming a predetermined angle relative thereto,
    and a viewing surface secured to said support means generally normal to a viewing axis extending between said viewing surface and a central portion of said reflective surface, and the angle of said viewing axis to said reflective surface being substantially equal to said predetermined angle,
    said reference point being adapted for engagement with said projection surface and said support means being freely movable to establish any desired angle between said reference axis and said projection surface.

2. A focusing device for use with a projection surface comprising:
    a first portion with a first end forming a base and a second end forming an apex,
    a reflective means mounted in the first end of said first portion for reflecting light rays,
    a second portion with first and second open ends,
    the second open end of said second portion connected to the first end of said first portion,
    means mounted at the first open end of said second member for viewing said reflected light rays,
    said apex being adapted for engagement with said projection surface, and
    said focusing device being tiltable to any desired angular position while maintaining said apex in engagement with said projection surface.

3. A focusing device as set forth in claim 2 wherein said reflective means mounted in the first end of said first portion forms an acute angle A with the horizontal, and
    said viewing means mounted at the first open end of said second portion forms an acute angle 2A with the horizontal.

4. A focusing device as set forth in claim 3 wherein the shortest distance from the midpoint of said reflective means to said apex forms a reference axis,
    the shortest distance from the midpoint of said reflective means to the midpoint of said viewing means forms a viewing axis,
    said distances being equal,
    and said reflecting means bisecting the angle formed between said reference axis and said viewing axis.

5. A focusing device as set forth in claim 4 further comprising:
    a hollow sleeve member having first and second open ends and a slightly larger cross-sectional area than said second portion for frictionally fitting the second open end over said screen means, and
    a magnifying means mounted in the first open end of said sleeve member.

6. A focusing device as set forth in claim 4 further comprising:
    a pivot means connecting at least said reflecting means and said second portion for allowing said second portion to be adjustable in position and for maintaining said reflecting means bisecting the angle formed between said reference axis and said viewing axis.

7. A method of using a focusing device to focus a photographic enlarger comprising an enlarging lens, an easel, a light source and a photographic negative positioned between said light source and said enlarging lens comprising the steps of:
    a. placing one end of said focusing device at any point of the surface of said easel,
    b. while maintaining the point of contact established in step (a) moving the angular position with respect to said easel of said focusing device until said focusing device forms a symmetrical shadow with the point of contact between said focusing device and said easel as a center point,
    c. viewing said photographic negative as an image generated by said focusing device,
    d. adjusting the distance between said photographic negative and said enlarging lens until the image viewed in step (c) is of any desired clarity.

8. A focusing device for use with a photographic enlarger comprising
    a first portion with a first end forming a base and sides tapering to a second end forming an apex,
    a reflecting means having at least one reflective surface mounted at said first end of said first portion forming a small acute angle with the horizontal,
    said reflective surface of said reflecting means facing away from said second end of said first portion,
    a hollow and substantially rectangular second portion having first and second open ends,
    said second open end of said rectangular second portion connected at said first end of said first portion forming an angle with the vertical twice as large as that formed by said reflecting means with the horizontal,
    a viewing surface mounted at said first open end of said rectangular second portion forming an acute angle with the horizontal twice as large as that formed by said reflecting means, and
    a cut-out portion in the uppermost side of said rectangular second portion to permit light to reach said reflecting means.

9. A focusing device of claim 8 wherein,
    the distance from the midpoint of said reflecting means to said apex forms a reference axis, the distance from the midpoint of said reflecting means to the midpoint of said viewing surface forms a viewing axis, said distances are equal, and said reflecting means bisects the angle between said axis.

10. A focusing device of claim 8 further comprising:

a hollow substantially rectangular sleeve member having first and second open ends and a slightly larger cross-sectional area than said rectangular member for frictional fitting the second open end over said viewing surface mounted in the first open end of said rectangular member, a magnifying means mounted in the first open end of said sleeve member.

11. A focusing device as set forth in claim 9 further comprising a pivot means connecting at least said reflecting means and said second portion for allowing said second portion to be adjustable in position and for maintaining said reflecting means bisecting the angle formed between said reference axis and said viewing axis.

* * * * *